Nov. 17, 1936.  L. HELLMER  2,061,401
DIRECTION INDICATOR
Filed Aug. 2, 1935
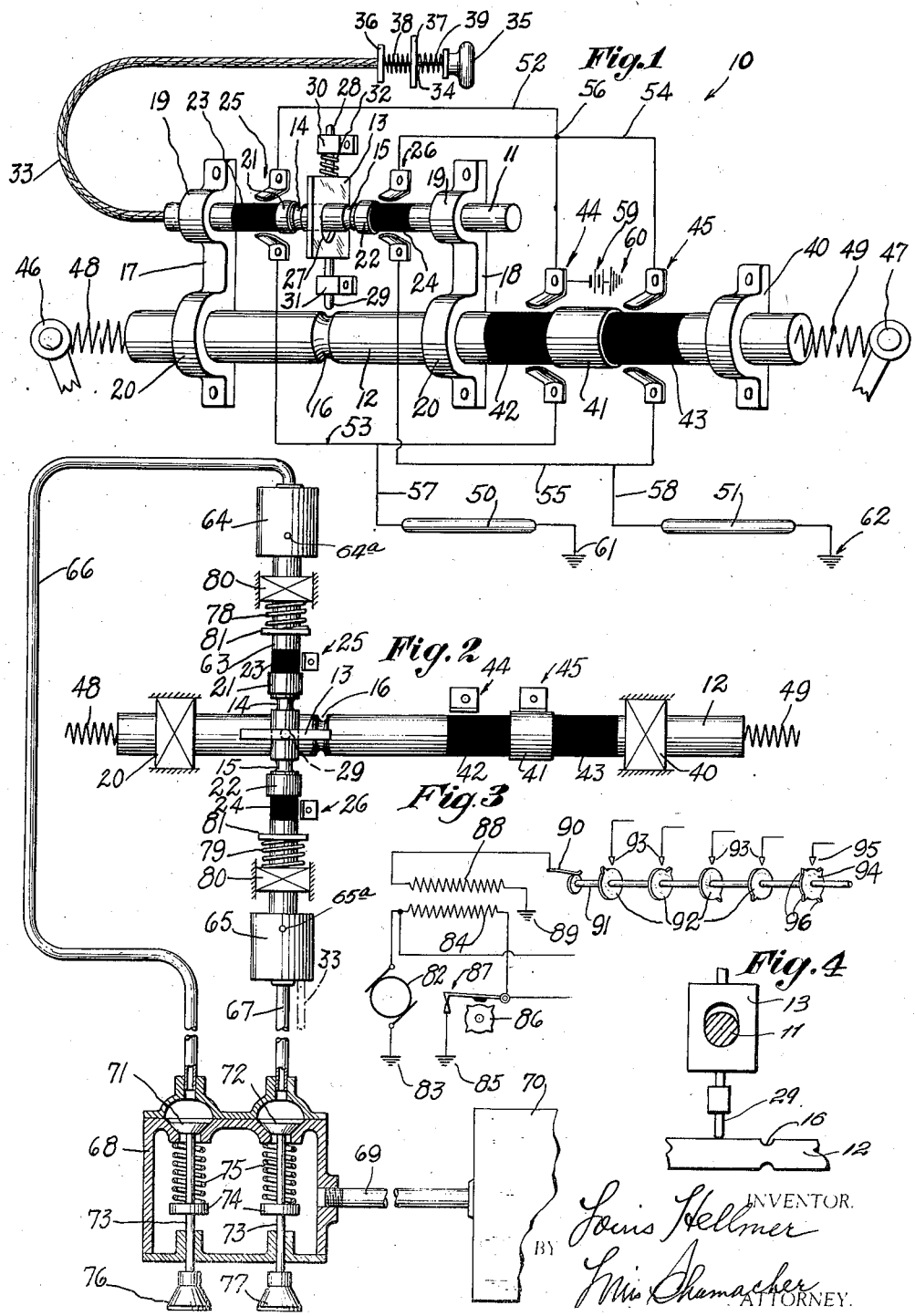
INVENTOR.
Louis Hellmer
BY
ATTORNEY.

Patented Nov. 17, 1936

2,061,401

UNITED STATES PATENT OFFICE 2,061,401

DIRECTION INDICATOR

Louis Hellmer, Merrick, N. Y.

Application August 2, 1935, Serial No. 34,368

13 Claims. (Cl. 177—337)

This invention relates to devices such as direction indicating systems for automobiles.

One object of the invention is to provide a device of the character described having improved means for indicating the direction of an automobile both automatically and at will in an improved manner, such that the automatic means is superior to and releases the means that is controlled at will.

Direction indicators operative at will, for instance, manually, have been well known, and possess their value in that the operator can indicate that he intends to turn or deviate from his path before actually making the turn or deviation. Devices of this character, however, have a serious drawback in that the operator may forget or through negligence fail to operate the indicating system.

Hence another class of devices was originated to automatically cause indications of a deviation of an automobile from its path to thus strongly impress the occurrence of such a deviation upon the eye of a succeeding driver, whose mind may otherwise be distracted particularly in heavy traffic. The automatic devices, however, possess a short-coming in that they cannot operate before the occurrence of a deviation or turn, but only on actual occurrence of the same, so that comparatively short notice is afforded to the succeeding driver.

By my invention a manual type of indicator system or the characteristic thereof is combined with an automatic type of indicator system or the characteristic thereof, to obtain the advantages of both, and to balance out their individual defects as far as possible.

Further, my invention represents an advance over the art in that while both systems may work independently of each other, yet when a turn or deviation of the automobile actually occurs, the action of the automatic system supersedes that of the manual system, so that the latter may be released without any change at all in the indicator means.

Further still, owing to the fact that the manual means, upon being operated, is preferably automatically locked in operative position, due to the time interval that must elapse before the turn or deviation actually occurs, I utilize the automatic system or a part associated therewith to automatically release the manual system so that the latter may return, preferably automatically, to initial inoperative position, so as to be instantly ready to receive a succeeding impulse or actuation for indicating the next succeeding turn or deviation that is to be made.

Thus by my invention the operator is required to pay as little attention as possible to the indicating device, and can actuate the same with a minimum of physical and mental exertion.

Another object of the invention is, therefore, to provide a device of the type set forth which shall possess the advantages mentioned, and avoid the defects above pointed out.

Another object of the invention is the provision of a device of the class alluded to having lighting means of high luminosity and which require an electrical current of high voltage, but low amperage, so as not to overload the generator or other power plant of the automobile, and the arrangement being improved so as to avoid interference with the distribution of current to a multi-cylinder motor.

A further object of the invention is to furnish a device of the type mentioned having relatively few and simple parts, and which is inexpensive to manufacture, compact, durable, reliable, convenient and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is an isometric perspective view in elevation, diagrammatic in character, showing in neutral position a device embodying the invention, with certain parts removed.

Fig. 2 is a diagrammatic plan view with parts removed, parts in section, showing a modified device embodying the invention, with the automatic switch in operative position.

Fig. 3 is a schematic view of the power plant layout and circuit for the automobile motor and indicator lamps.

Fig. 4 is a fragmentary vertical sectional view of a part of the mechanism shown in Fig. 2.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may include relatively movable parts, including, for instance, parts of one or more switches for controlling a suitable indicator means, with one part such as 11 movable manually, and another part, such as 12, movable automatically, and a latch element such as 13 for the part 11 being responsive, for example, to one or more grooved or recessed portions 14, 15 of the part 11, and being controlled or released by the part 12, for instance, at a grooved or recessed part 16 thereof.

More particularly, the parts 11 and 12 may indicate longitudinally movable vertically spaced parallel bars slidably mounted as in spaced brackets 17, 18 secured to a suitable insulated or conductor panel or support (not shown), as may be required. The brackets 17, 18 may have alined bearings or hubs 19, 20 in which the respective bars 11, 12 are slidable.

The bar 11 may have a plurality of conductor rings 21, 22 spaced in uniform relation relative to the annular grooves 14, 15 and disposed at the outer sides of the latter in spaced relation thereto. Said bar 11 may also have insulator or insulated portions 23, 24, denoted by freedom of shading lines, and disposed intermediate of the conductor rings 21, 22 and the brackets 17, 18.

Associated with each conductor ring 21, 22 is a switch element 25, 26 respectively, each comprising preferably a plurality of spring blades of angle form to provide flanges to be secured to the support for the brackets 17, 18. The blades are adapted for wiping or sliding contact with the switch elements or rings 21, 22, but are spaced so as not to contact the insulator portions 23, 24, the rings 21, 22 being of larger diameter than the portions 23, 24. The switch elements 25, 26 are disposed in symmetrical relation relative to the switch elements 21, 22, so that in the neutral position shown, both switches are open with the elements 25, 26 being adjacent to the insulator portions 23, 24. However, upon movement of the bar 11 in either direction, one switch element 25 or 26 engages a conductor ring 21 or 22, with the blades contacting the ring on opposite sides thereof, while the other switch remains open.

The latching element 13 may be in the nature of a plate disposed at right angles to the bar 11 and having a hole or slot 27 to receive the latter. Said plate may be located centrally between the grooves 14, 15 in the neutral position of the switch bar 11, and may have vertically alined pins or stems 28, 29 secured thereto, and having an axis intersecting the axis of the bar 11 and lying in the plane of the plate 13. Said pins 28, 29 may be vertically slidable in respective bearings 30, 31 that may be mounted on the support for the brackets 17, 18. An expansion coil spring 32, taking around the pin 28 may act between the bracket 30 and the plate 13 to urge the latter downwardly to seat at the slot 27 on the bar 11. The plate 13 is further downwardly movable under actuation of the spring 32 to seat at the slot 27 within one of the grooves 14, 15 in the bar 11, and the pin 29 moving downward correspondingly to engage in the annularly grooved portion 16 of the bar 12.

For causing longitudinal movement of the switch bar 11, a conventional flexible cable 33 may be employed, the same comprising, for instance, a sheathed wire 34 suitably connected to the bar 11 at one end thereof and to a finger piece 35, which may be on the steering wheel, dashboard, or otherwise within convenient reach of the operator. Also connected to said wire is a collar 36, and a stationary member 37, through which the wire 34 passes, may lie between the collar 36 and the finger piece 35. Expansion coil springs 38, 39 may take around the wire 34 and may act respectively between the collar 36 and the member 37, and between the finger piece 35 and the member 37. It will now be clear that upon pulling the finger piece 35, the spring 38 is compressed, and the switch bar 11 is moved toward the left. Upon pushing the finger piece 35, a reverse action occurs, with the spring 39 being compressed. Upon release of the finger piece, the compressed spring, 38 or 39, as the case may be, will actuate the wire 34 to return the switch bar 11 to neutral position as shown, assuming that the latching element 13 is not in locking position as hereinafter described. In the neutral position, the springs 38, 39 balance each other.

The bar 12 may have an end extension slidably supported in a bearing 40. Intermediate of the latter and the bracket 18, I may provide a conductor ring or switch element 41 sleeved on said bar, and being of larger diameter than the flanking insulator or insulated portions 42, 43, shown without shading lines. Coacting with the ring 41 are a plurality of switch elements 44, 45 disposed in uniform relation to the ring 41 at opposite edges thereof in the neutral position. Thus each element 44, 45 includes a pair of resilient switch blades, similar to those at 25, 26, the blades of each element being normally on diametrically opposite sides of the bar 12 and being spaced from the insulator portions 42, 43, and from the ring 41, in neutral position. It will be understood that the parts 44, 45 and 40 may be mounted on the support for the brackets 17, 18 in rigid relation. If now the switch bar is moved either to the right or left, the element 41 makes contact between the blades of one of the switch elements 44, 45.

It is noted that the groove 16 is disposed between the brackets 17, 18 and lies in the neutral position in the plane of the pin 29 at right angles to the switch bar 12. The bars 11, 12 may or may not be rotatable.

For shifting the switch bar 12 longitudinally, the same may be connected at its opposite ends to elements 46, 47 of any steering gear or mechanism of an automobile, the connections being effected desirably by coil springs 48, 49 to afford lateral and longitudinal flexibility. In the neutral position of the steering means, as for straight driving, all parts balance to maintain the switch bar 12 in the neutral position shown. Upon occurrence of a deviation or turn right or left from straight driving, one or the other of the elements 48, 49 as the case may be, acting in tension, moves the switch bar 12 left or right, respectively, to close a switch at 44, 45 and to cause the groove 16 by a cam action at its sides, to raise the follower pin 29 and hence the plate 13 in the event that plate is seated in locking position in one of the locking grooves 14, 15.

It is thus seen that the groove 16 possesses a cam action longitudinally of the switch bar 12, and has correspondingly sloping side or marginal portions, with the end of the pin 29 being rounded, while the grooves 14, 15 are relatively sharp, and the edges of the hole 27 correspondingly sharp for locking engagement. It may also be noted that a relatively slight movement of the switch bar 12 closes a switch, because element 41 is in close proximity to the elements 44, 45.

The indicating means may comprise one or more lamps disposed at the front end, rear end, and dashboard of the automobile, or in other suitable positions, but it will be sufficient illustratively to show a pair of lamps 50, 51 to indicate left and right turns or deviations, respectively. These lamps are preferably of the gas filled electrode type operative by a small current of high potential, and may be of the well known neon type. Circuit means interconnect these lamps with the various switches. For instance, the upper contact blades of the switch elements 25 and 44 are interconnected by a conductor 52, and the lower contact blades of these switch elements are interconnected by a conductor 53. Similarly, the upper contact blades of switch elements 26 and 45 are interconnected by a conductor 54, and the lower contact blades of these elements are interconnected by a conductor 55. It is thus seen that the switches at 25, 44, and at 26, 45, respectively, are in multiple, but act in a sort of unison so that either may close a circuit, and either may open without opening the circuit. The conductor leads 52, 54 are interconnected at 56. The conductors 53, 55 are connected to electrodes of the different lamps 50, 51 by conductors 57, 58 respectively. A source of current 59 may be connected to the conductor 52 so that current is also supplied to conductor 54 at 56. Said source of current and the lamps 50, 51 may be grounded at 60, 61, 62 respectively.

In Fig. 2 is shown a modification of the invention which may be like that of Fig. 1, in all respects, except that the switch bar 63 corresponding to bar 11 is at right angles to the switch bar 12, but both bars lie in parallel planes; also certain other details are changed therein. The advantage of so positioning the switch bar 11 to extend fore and aft of the automobile is that bends in the flexible cable means 33 are kept at a minimum and may be quite gradual, since the cable will extend substantially directly toward the driver. Certain parts such as 28, 30, 32 have been omitted for clarity in the drawing. Primarily the device of Fig. 2 is intended to illustrate a pneumatic control for the switch bar 63. Thus suitable cylinders 64, 65 are provided for the ends of the switch bar 63, which may act as pistons in the cylinders. Conduits 66, 67 connect the different cylinders with a chamber 68, which is connected by a conduit 69 to a suction manifold or chamber 70 of the automobile motor. Communication of the conduits 66, 67 with the chamber 68 may be controlled by valves 71, 72 mounted on stems 73 having collars 74, and expansion coil springs 75 taking around the stems and acting between the collars and a wall of the casing to close the valves. The latter may be individually opened by pressure on the finger pieces 76, 77 connected to the stems. Suction in the cylinders 64, 65 may be relieved by pin holes 64a, 65a or leakage clearance with the pistons of the cylinders. To return the switch bar 63 to neutral position expansion opposed coil springs 78, 79 may take around the switch bar and act between bearings 80 and collars 81 on said switch bar. The cable 33 may be used in the device of Fig. 2, suitably connected to the bar 63 or adjacent piston as in a cylinder thereof, as shown in dot-dash lines.

In Fig. 3 is shown the power plant layout for the lamps 50, 51. The same may include a generator 82 grounded at 83 and connected to a primary winding 84 of an induction coil, said winding being grounded at 85. An interrupter including a cam 86 and a make and break switch 87 may be placed in the primary winding. The secondary winding 88 of the induction coil may be grounded at 89 and connected to a switch arm 90 for wiping contact with a shaft 91 of a distributor. The latter may have a series of cams 92 for the contact points 93 that lead to the spark plugs of the cylinders of a multi cylinder automobile motor. The distributor operates in uniform synchronous timing for the successive firing of the cylinders in the usual manner. Any number of cams may be provided according to the number of cylinders. An additional cam 94 may be provided on the shaft 91 for coaction with a contact 95 which may constitute the source of current 59 shown in Fig. 1. Thus a fluctuating current is important to the lamps 50, 51 to produce a flickering light of enhanced distinctiveness. The cam 94 may have one or more points or contacts 96 according to the rapidity of the flicker desired, and the points may be angularly offset or staggered relative to the contact portions of the cams 92 so that the current for the lamps 50, 51 is taken at an instant when it is not required for the spark plugs.

The operation of the invention will now be described. If the operator desires to make a turn or deviation in the path of his car, he will correspondingly actuate the button 35 or one of the buttons 76, 77 to shift the switch bar 11 or 63, as the case may be. The latching element 13 then drops into one of the locking grooves 14 or 15, and the pin 29 enters the cam groove 16. One or the other of the switches is closed, at 25 or 26, and the corresponding lamp 50 or 51 is lit. This set up remains until the car actually makes the turn or deviation, whereupon the switch bar 12 moves in a corresponding direction to close one of the switches at 44 or 45 for the lamp that is lit, and simultaneously elevates the latch 13 at the cam groove 16, so that the latch releases the switch bar 11, permitting it to return to neutral position and to open its switches. When the turn or deviation is completed, the switch bar 12 is returned to neutral position and opens its switches, so that the lamps are dark. The current from the distributor cam 94 or winding 99 enters the circuit at 59 to pass through any of the switches at 25, 26, 44 or 45 that may be closed, the current flowing along the conductors 52 or 54, and the circuit being completed for these switches by the conductors 53 or 55 through the respective lamps 50, 51. Should the car make a turn or deviation without the switch bar 11 or 63 having been preset, one of the switches at 44 or 45 will close, depending upon the direction of the car, and one or the other of the lamps 50, 51 will be lit.

It is thus seen that the objects of the invention have been fulfilled by the illustrative embodiment shown and described, and which is defined in the succeeding claims.

I claim:

1. A direction indicator system for automobiles, including direction indicator means, manual means for operating the same, automatic means responsive to the steering means of the automobile for operating the direction indicator means, the manual means and the automatic means each having operative and inoperative positions relative to the direction indicator means, means urging the manual means toward inoperative position, an element for releasably locking the manual means in an operative position and the automatic means cooperating with the element to release the same upon movement of the automatic means to an operative position, and the element being independent of the automatic means in the inoperative position of the latter, and the manual means including manually controlled pneumatic means operative by motor suction of the automobile, whereby the manual means can be directly moved to operative position without interference from said element.

2. A direction indicator system for an automobile, including direction indicator means, a single manual means for operating the same, a single automatic means responsive to the steering means of the automobile for operating the direction indicator means, the manual means and the automatic means each having a plurality of operative spaced positions and an inoperative position therebetween, and a single element for mechanically releasably locking the manual means in either operative position, at will, and the automatic means in either of its operative positions coacting with the element to release the same to permit the manual means to return to inoperative position.

3. A direction indicator system for an automobile, including direction indicator means, manual means for operating the same, automatic means responsive to the steering means of the automobile for operating the direction indicator means, the manual means and the automatic means each having a plurality of operative spaced positions and an inoperative position therebetween, a separate unitary element for automatically releasably locking the manual means in either operative position, at will, and the automatic means in either of its operative positions coacting with the element to actuate the same to permit the manual means to return to inoperative position, the said element being ineffective to lock the manual means in the inoperative position thereof, and means urging the manual means toward the inoperative position thereof.

4. A direction indicator system for an automobile, including direction indicator means, manual means for operating the same, automatic means responsive to the steering means of the automobile for operating the direction indicator means, the manual means and the automatic means each having a plurality of operative spaced positions and an inoperative position therebetween, an element for releasably locking the manual means in either operative position, at will, and the automatic means in either of its operative positions coacting with the element to release the same to permit the manual means to return to inoperative position, and coil spring means extending in opposite directions and interconnecting different portions of the automatic means with adjacent portions of the steering system for actuation of the former by the latter.

5. A direction indicator system for an automobile, including direction indicator means, manual means for operating the same, automatic means responsive to the steering means of the automobile for operating the direction indicator manual and automatic means each including a means, electrical circuit means for the latter, the set of spaced switches for the circuit means for independently operating the direction indicator means, each set of switches comprising a longitudinally movable actuator bar for the switches, each bar being movable in opposite directions so as to have switch closing positions and an intermediate switch opening position, means for constantly urging the bar for the manual means toward switch opening position, each of said bars having a recessed portion, a movable locking element associated with the bar of the manual means for engaging and disengaging the recessed portion thereof for locking said bar in switch closing position and for releasing said bar to permit the same to return to switch opening position, and the bar of the automatic means having its recessed portion disposed to engage the locking element in the switch closing position of the manual means and to actuate the locking element in the switch closing position of the automatic means to cause the locking element to release the actuator bar of the manual means.

6. A direction indicator system for an automobile according to claim 5, wherein said actuator bars are disposed along planes at an angle to each other, so that the bar for the automatic means extends crosswise of the automobile and the bar for the manual means extends fore and aft of the same, and a flexible cable for causing the longitudinal movement of the bar of the manual means, said cable having means adapted to be disposed within easy reach of the driver for actuating the cable.

7. A direction indicator for automobiles according to claim 2, wherein the manual means includes a flexible cable for its actuation, a relatively stationary member, and oppositely acting springs on opposite sides of the member for acting on the cable to cause the manual means to return to intermediate position from either of its operative positions.

8. A direction indicator for an automobile, according to claim 2, wherein the manual means includes pneumatic means deriving power from the automobile motor for moving the manual means in one or in a different direction to occupy the said operative positions, and valve elements for controlling the pneumatic means according to the desired movement of the manual means.

9. A direction indicator system for an automobile, according to claim 5, wherein piston and cylinder means are associated with the ends of the bar of the manual means, conduits connecting said piston and cylinder means with a suction chamber of the automobile motor, and valves for controlling the different conduits at will.

10. A direction indicator for automobiles including indicator means, manual means for operating the same, said manual means including a member having different spaced operative positions for right and left signals of the indicator means, means urging said member to third normal inoperative position, means automatically responsive to changes in the position of the steering mechanism for causing the indicator means to automatically show right and left signals, the manual and automatic means comprising means for locking the said member in either operative position and being responsive to the automatic means upon operation of the latter to release said member and permit the same to return to inoperative position, and the manual and automatic means so cooperating with each other so that a signal setting of the manual means for one direction is nullified by a turn or deviation of the automobile in a different direction, with the latter signaled by the indicator means.

11. A direction indicator for automobiles, including indicator means for causing operation of the indicator means for right and left signals, including a member movable into different spaced operative positions, means urging said member to a different inoperative position, pneumatic means including means to move said member at will to one or another of the operative positions, the pneumatic means comprising means for connecting the same to a vacuum chamber of the automobile motor, and the pneumatic means having an opening for leakage to automatically cause said member to be released to permit the same to return to inoperative position.

12. A direction indicator for automobiles including indicator means, manual means for operating the same, automatic means responsive to the steering mechanism of the automobile for operating the indicator means, either of said manual and automatic means being movable from operative to inoperative position without affecting the indicator means upon energization of the latter by one of said manual and automatic means, and the manual means including pneumatic means for actuating the same to an operative position, means urging said manual means to return to inoperative position, and the pneumatic means having leakage to permit the manual means to gradually return to inoperative position without affecting the automatic means.

13. A direction indicator system for an automobile including direction indicator means, manual means for operating the same, automatic means responsive to the steering means of the automobile for operating the direction indicator means, the manual and automatic means each having operative and inoperative positions, means urging the manual means toward inoperative position, an element releasably locking the manual means in an operative position, the automatic means in operative position coacting with the element to release the same to permit the manual means to return to inoperative position, and each of said manual and automatic means having a bar having a recess, said element being engageable and disengageable, in both recesses substantially simultaneously to control the manual means.

LOUIS HELLMER.